United States Patent

Ito et al.

[11] Patent Number: 5,309,278
[45] Date of Patent: May 3, 1994

[54] REAL-IMAGE VARIABLE MAGNIFICATION FINDER INCLUDING A LIGHT SHIELD BETWEEN TWO MOVING LENS GROUPS

[75] Inventors: Takayuki Ito; Sachio Hasushita, both of Tokyo, Japan

[73] Assignee: Asahi Kogaku Kogyo Kabushiki Kaisha, Tokyo, Japan

[21] Appl. No.: 952,806

[22] Filed: Sep. 28, 1992

[30] Foreign Application Priority Data

Sep. 26, 1991 [JP] Japan .................. 3-320117

[51] Int. Cl.$^5$ ............ G03B 13/06; G02B 13/10; G02B 23/14; G02B 15/163
[52] U.S. Cl. .................. 359/432; 359/740; 359/685; 359/680; 359/691
[58] Field of Search .......... 359/432, 422, 691, 740, 359/683, 676, 685, 680, 691

[56] References Cited

U.S. PATENT DOCUMENTS

| | | |
|---|---|---|
| 4,367,927 | 1/1983 | Fujii . |
| 4,637,690 | 1/1987 | Miyamae et al. .......... 359/740 |
| 4,779,969 | 10/1988 | Sato et al. . |
| 4,842,395 | 6/1989 | Sato et al. . |
| 4,909,615 | 3/1990 | Ueda . |
| 4,963,005 | 10/1990 | Tsuji . |

FOREIGN PATENT DOCUMENTS 2241082A 8/1991 United Kingdom .

Primary Examiner—Jon W. Henry
Attorney, Agent, or Firm—Sughrue, Mion, Zinn, Macpeak & Seas

[57] ABSTRACT

A real-image variable magnification finder is capable of blocking deleterious rays of light without increasing the lens diameter or the size of the erecting prism even of the view angle is large. The improved finder includes, in order from the object side, objective lens system II, condenser lens III with which the image of the object formed by the objective lens system II is directed to eyepiece lens system V, erecting prism system IV for inverting the image of the object, and eyepiece lens system V, and the objective lens system II comprises at least two zooming groups IIA and IIB that will move along the optical axis and light shielding means A that is provided between the zooming groups for blocking deleterious rays of light.

8 Claims, 3 Drawing Sheets

REAL-IMAGE VARIABLE MAGNIFICATION FINDER INCLUDING A LIGHT SHIELD BETWEEN TWO MOVING LENS GROUPS

DETAILED DESCRIPTION OF THE INVENTION

The present application is based upon Japanese Patent application No. HEI. 3-320117 filed Sep. 26, 1991, a disclosure of which is incorporated therein by reference.

The present invention relates to a real-image variable magnification finder which is to be used with a compact camera, etc. More particularly, the present invention relates to a finder that has a means of blocking deleterious rays of light.

A real-image variable magnification finder of the type commonly used in the art comprises an objective lens system composed of at least two zooming groups capable of moving along the optical axis, an erecting prism system and an eyepiece lens system, and the lens barrel for retaining the respective zooming groups also serves as a means of blocking deleterious rays of light.

However, the above-described prior art finder which relies solely upon the lens barrel to block deleterious rays of light has the problem that if the view angle is large, the diameter of the front lens of the objective lens group will increase while, at the same time, the rays of light at the middle view angle will increase to be reflected at a lateral side of the prism for inverting the image of the object to produce deleterious rays that travel in a different path than the normal rays until they reach the pupil of the user. Such deleterious rays of light can be eliminated by increasing the size of the prism but then the finder become bulky, making it impossible to realize a compact camera.

SUMMARY OF THE INVENTION

The present invention has been accomplished under these circumstances and has as an object providing a real-image variable magnification finder that is capable of blocking deleterious rays of light without increasing the lens diameter or prism size even if the view angle is large.

This and other objects of the present invention can be attained by a real-image variable magnification finder that comprises, in order from the object side, an objective lens system, a condenser lens with which the image of the object formed by the objective lens system is directed to an eyepiece lens system, an erecting prism system for inverting the image for the object, and the eyepiece lens system, the objective lens system comprising at least two moving groups that will move along the optical axis and a light shielding means that is provided between the moving groups for blocking deleterious rays of light.

BRIEF DESCRIPTION OF THE DRAWINGS

In the accompanied drawings.

DESCRIPTION OF THE PREFERRED EMBODIMENTS

Two examples of the present invention are described below.

EXAMPLE 1

Figure 1:
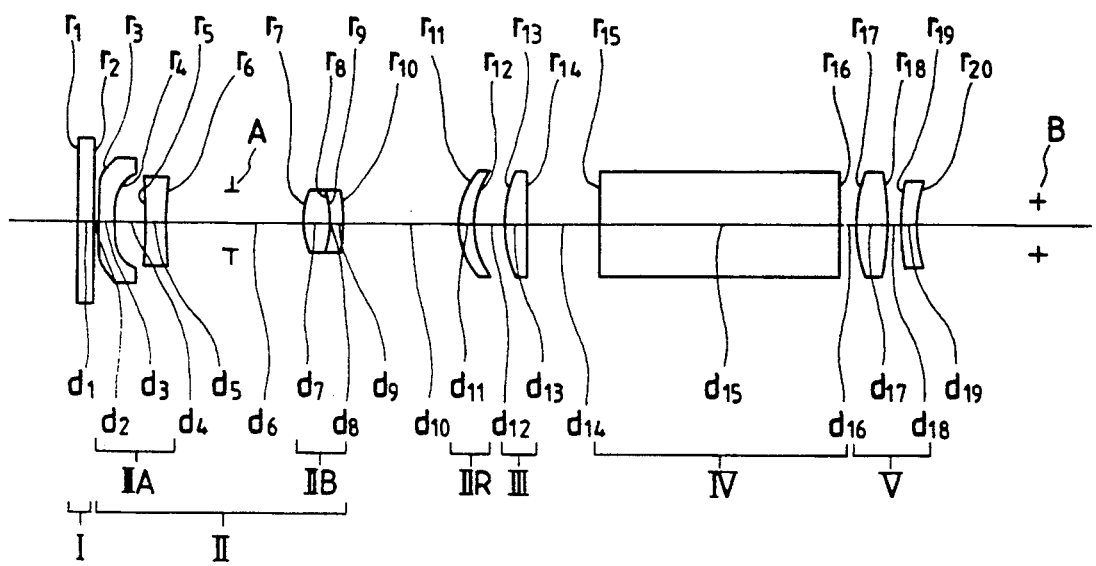
FIG. 1 is a simplified cross-sectional view showing the real-image variable magnification finder of Example 1 at the low magnification end.
Figure 2:
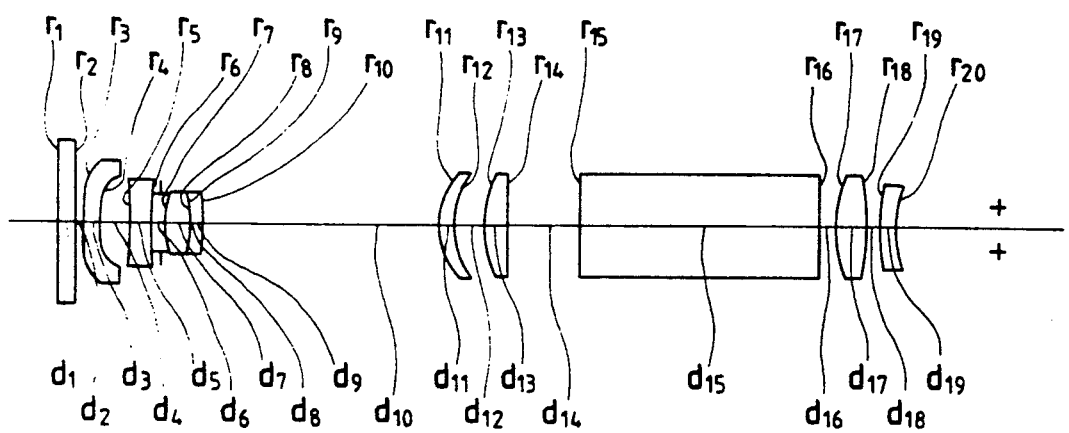
FIG. 2 is a simplified cross-sectional view showing the real-image variable magnification finder of Example 2 at the high magnification end.

FIGS. 1 and 2 are simplified schematic cross-sectional views showing the real-image variable magnification finder of Example 1; FIG. 1 refers to the case for low magnification and FIG. 2 refers to the case for high magnification. The finder comprises, in order from the object side shown on the left of each figure, a cover glass I composed of a plane-parallel plate as denoted by the first and second surfaces, and objective lens system II composed of two zooming lens groups consisting of four lens elements as denoted by the third to the tenth surfaces, a lens IIR for correcting the curvature of the field that will occur in the objective lens system as denoted by the eleventh and twelfth surfaces, a condenser lens III as denoted by the thirteenth and fourteenth surfaces, an erecting prism system IV for inverting the image of the object as shown expanded in a flat form to be denoted by the fifteenth and sixteenth surfaces, and an eyepiece lens system V composed of two lens elements as denoted by the seventeenth to the twentieth surfaces. Shown by symbol B in FIGS. 1 and 2 is the eyepoint.

The objective lens system II comprises the first and second zooming groups IIA and IIB each of which is composed of two lens elements and which will move upon zooming along the optical axis, and a light shielding means A that is provided between the two zooming groups for blocking deleterious rays of light. In Example 1, the light shielding means A will move upon zooming along the optical axis independently of the two zooming groups.

Figure 3:
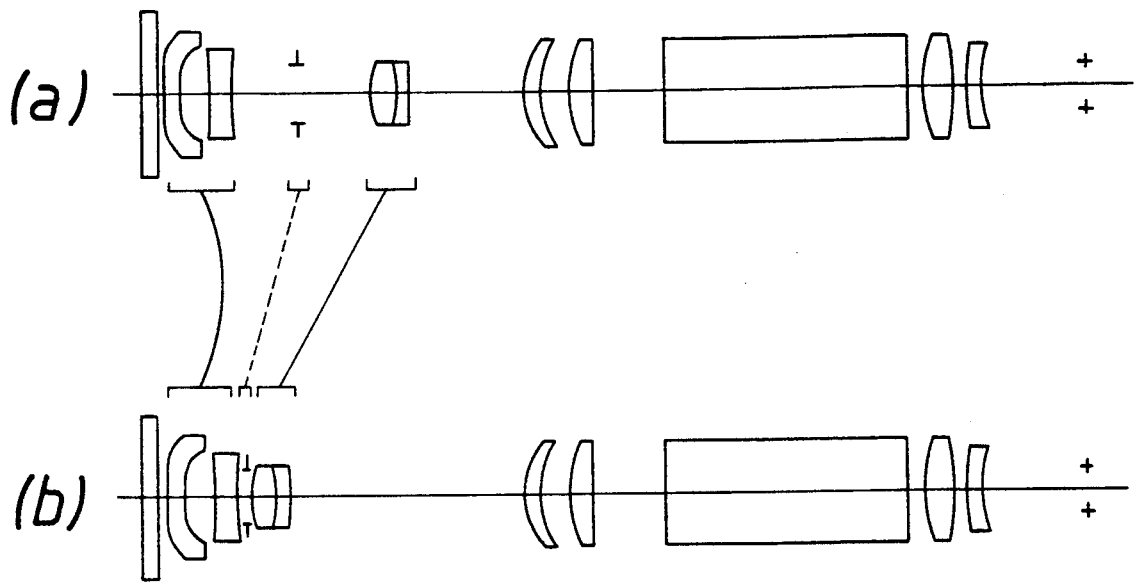
FIGS. 3A and 3B are diagram showing how lenses move during zooming of the real-image variable magnification finder of Example 1.

FIG. 3 shows the paths in which the zooming groups IIA and IIB and the light shielding means A move upon zooming of the finder of Example 1. Between the low magnification shown in FIGS. 3(a) an the high magnification shown in FIG. 3(b), the first zooming group IIA will move symmetrically with respect to the position taken at the middle magnification whereas the second zooming group IIB and the light shielding means A will move monotonically toward the object as the magnification increases.

By providing the light shielding means between the two zooming groups which is movable independently of the latter, the diameter of the front lens can be reduced compared to the case of blocking deleterious rays of light solely by means of the lens barrel ever if the view angle is increased. Further, by insuring that the pupil of the photographer which is located at the eyepoint B is optically conjugate with the light shielding means A, it also becomes easy to block deleterious rays of light that issue at the middle view angle.

If the zooming ratio is fairly large as in the case of Example 1, the zooming groups IIA and IIB have to be moved by a large amount; hence, if the light shielding means A is fixed in such a way that it will not move during zooming, the zooming groups IIA and IIB have the potential to interfere with the light shielding means A as they approach the latter. Conversely, if the zooming groups depart away from the light shielding means A, the distance to the latter becomes large enough to cause the need to increase the lens diameter of the zooming groups. To avoid these problems, it is desired to adapt the light shielding means to be capable of moving independently of the zooming groups.

If possible mechanistically, the light shielding means may be adapted in such a way that its aperture diameter is variable with zooming and this helps achieve more effective blocking of deleterious rays of light.

The specific numerical data for Example 1 are as set forth in Tables 1 to 3 below. In the data sheets given there, r denotes the radius of curvature of an individual lens surface, d the thickness of an individual lens or the airspaces between adjacent lenses (all parameters are in millimeters), n the refractive index of an individual lens at the d-line, and $v$ the Abbe number of an individual lens at the d-line.

The lens system of Example 1 is aspheric at the following surfaces, 3 to 7, 10, 11, 13 and 18. The shape of an aspheric surface can be expressed by the following equation:

$$X = \frac{CY^2}{1 + \sqrt{1 - (1+K)C^2Y^2}} + A4Y^4 + A6Y^6 + A8Y^8$$

where X is the distance by which the coordinates at the point on the aspheric surface where the height from the optical axis is Y are departed from the plane tangent to the vertex of the aspheric surface; C is the curvature (1/r) of the vertex of the aspheric surface; K is the conic constant; and A4, A6 and A8 are the aspheric coefficients of the fourth, sixth and eighth orders, respectively.

The conic constants and aspheric coefficients of the respective aspheric surfaces are as shown in Table 2. The values for the radii of curvature of the aspheric surfaces listed in Table 1 are those for the vertices of those aspheric surfaces.

Magnification M and airspaces d2, d6 and d10 will vary with zooming as shown in Table 3.

TABLE 1

| Surface No. | r | d | n | $v$ |
|---|---|---|---|---|
| 1 | ∞ | 1.50 | 1.49176 | 57.4 |
| 2 | ∞ | variable | | |
| 3 | −28.827 | 1.50 | 1.58547 | 29.9 |
| 4 | 90.862 | 2.68 | | |
| 5 | −40.860 | 2.14 | 1.49176 | 57.4 |
| 6 | 23.508 | variable | | |
| 7 | 8.490 | 2.19 | 1.54350 | 54.3 |
| 8 | −10.830 | 0.22 | | |
| 9 | −10.612 | 1.20 | 1.58547 | 29.9 |
| 10 | −21.916 | variable | | |
| 11 | 7.285 | 1.50 | 1.49176 | 57.4 |
| 12 | 8.337 | 2.82 | | |
| 13 | 8.313 | 2.19 | 1.49176 | 57.4 |
| 14 | ∞ | 6.80 | | |
| 15 | ∞ | 23.00 | 1.49176 | 57.4 |
| 16 | ∞ | 1.50 | | |
| 17 | 12.738 | 2.70 | 1.49176 | 57.4 |
| 18 | −22.297 | 1.35 | | |
| 19 | 18.004 | 1.50 | 1.58547 | 29.9 |
| 20 | 10.593 | | | |

TABLE 2

| 3rd surface | 4th surface |
|---|---|
| K = 0 | K = 0 |
| A4 = 0.13304085 × $10^{-2}$ | A4 = 0.20042032 × $10^{-2}$ |
| A6 = 0.50187403 × $10^{-4}$ | A6 = 0.65821787 × $10^{-4}$ |
| A8 = −0.10191957 × $10^{-5}$ | A8 = 0.48330579 × $10^{-5}$ |
| 5th surface | 6th surface |
| K = 0 | K = 0 |
| A4 = −0.15509821 × $10^{-3}$ | A4 = −0.60380727 × $10^{-3}$ |
| A6 = 0.52784354 × $10^{-4}$ | A6 = 0.10815769 × $10^{-4}$ |
| A8 = −0.73439660 × $10^{-6}$ | A8 = −0.99348329 × $10^{-6}$ |
| 7th surface | 10th surface |
| K = 0 | K = 0 |
| A4 = 0.45866792 × $10^{-3}$ | A4 = 0.78514644 × $10^{-3}$ |
| A6 = 0.36680910 × $10^{-4}$ | A6 = 0.61706389 × $10^{-4}$ |
| A8 = 0.78931843 × $10^{-6}$ | A8 = −0.23187680 × $10^{-6}$ |
| 11th surface | 13th surface |
| K = 0 | K = 0 |
| A4 = −0.73107130 × $10^{-5}$ | A4 = −0.82148229 × $10^{-3}$ |
| A6 = 0.14307795 × $10^{-5}$ | A6 = 0.13529496 × $10^{-4}$ |
| A8 = 0 | A8 = −0.54305623 × $10^{-6}$ |
| 18th surface | |
| K = 0 | |
| A4 = 0.16076273 × $10^{-3}$ | |
| A6 = −0.54013387 × $10^{-6}$ | |

TABLE 3

| Diopter | −1.1 Dpt | −1.1 Dpt | −1.1 Dpt |
|---|---|---|---|
| Magnification | 0.34 | 0.60 | 0.89 |
| d2 | 0.55 | 3.37 | 0.96 |
| d6 | 13.16 | 4.72 | 1.27 |
| d10 | 10.99 | 16.60 | 22.47 |

EXAMPLE 2

Figure 4:
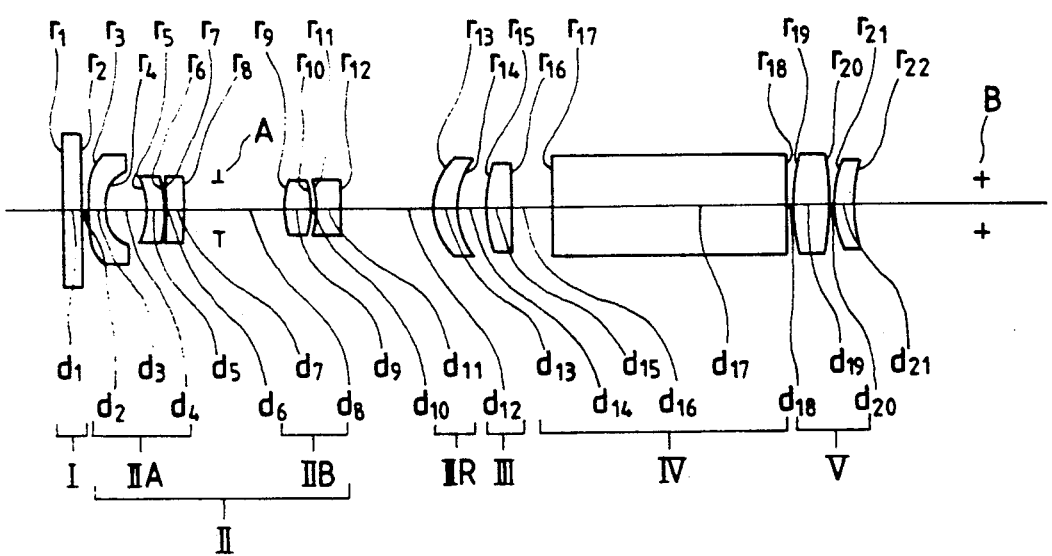
FIG. 4 is a simplified cross-sectional view showing the real-image variable magnification finder of Example 2 a the low magnification end.
Figure 5:
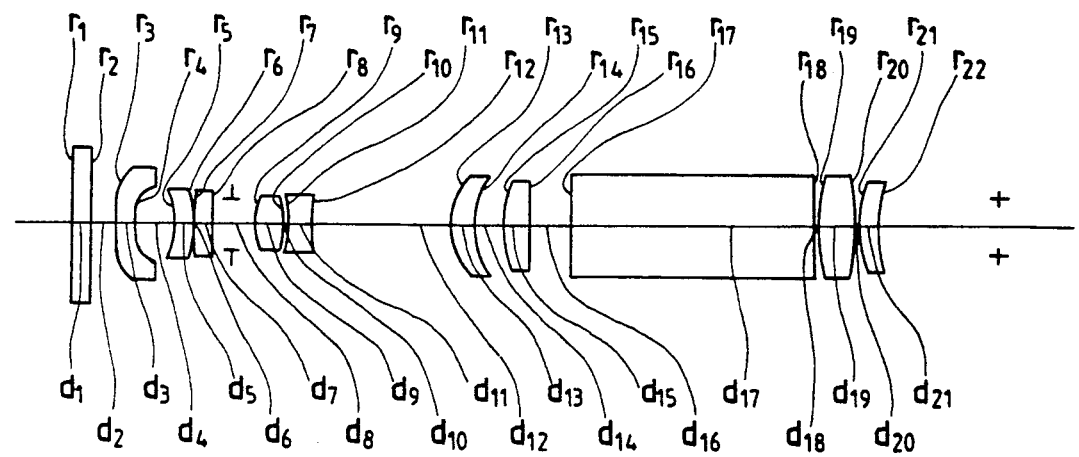
FIG. 5 is a simplified cross-sectional view showing the real-image variable magnification finder of Example 2 at the high magnification end.

FIGS. 4 and 5 are simplified schematic cross-sectional views showing the real variable magnification finder of Example 2; FIG. 4 refers to the case for low magnification and FIG. 5 refers to the case for high magnification. The symbols used in FIGS. 4 and 5 have the same meanings as defined for Example 1, except that in Example 2 the light shielding means A is fixed and will not move upon zooming.

If the zooming ratio is fairly small as in the case of Example 2, the light shielding means can be fixed without causing interference with the zooming groups or increasing the lens diameter; therefore, in the case under consideration, the light shielding means is preferably fixed to realize a simple construction.

Figure 6:
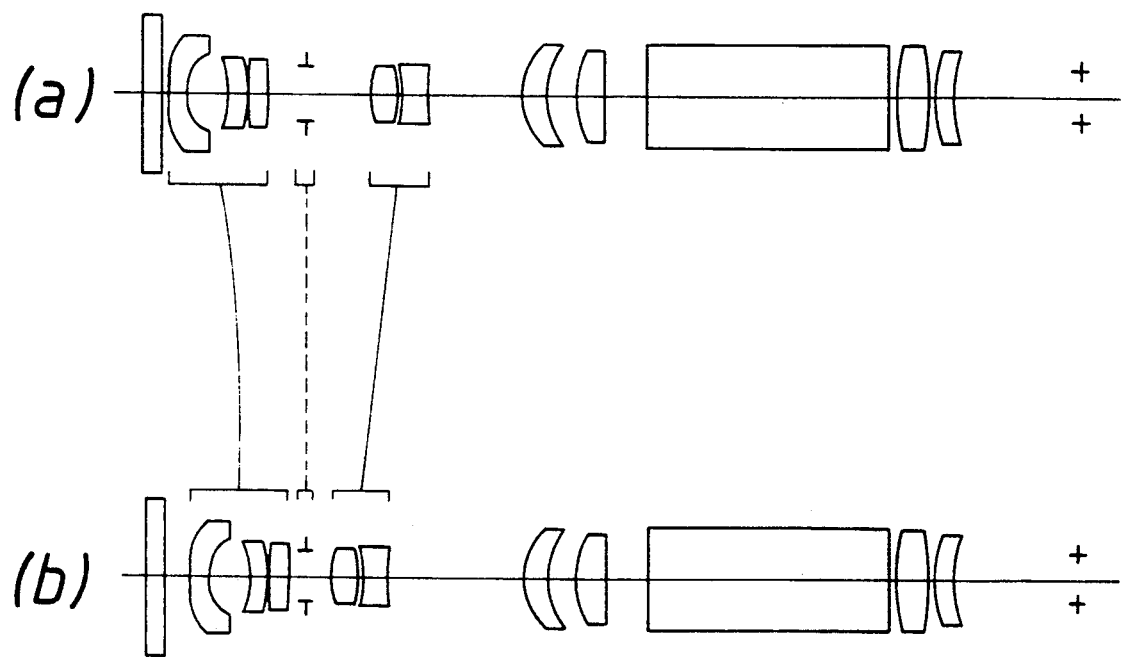
FIGS. 6A and 6B are diagram showing how lenses move during zooming of the real-image variable magnification finder of Example 2.

FIG. 6 shows the paths in which the zooming groups IIA and IIB move upon zooming of the finder of Example 2. Between the low magnification shown in FIG. 6(a) and the high magnification shown in FIG. 6(b), the first zooming group IIA will move toward the image and the second zooming group IIB toward the object monotonically as the magnification increases.

The specific numerical data for Example 2 are as set forth in Tables 4 to 6. The lens system of Example 2 is aspheric at the following surfaces, 3, 4, 8, 9, 12, 13, 15 and 20. The conic constants and aspheric coefficients of the respective aspheric surfaces are as shown in Table 5. Magnification M and airspaces d2, d8 and d12 will vary with zooming as shown in Table 6.

TABLE 4

| Surface No. | r | d | n | ν |
|---|---|---|---|---|
| 1 | ∞ | 1.50 | 1.49176 | 57.4 |
| 2 | ∞ | variable | | |
| 3 | 93.777 | 1.50 | 1.58547 | 29.9 |
| 4 | 6.760 | 3.32 | | |
| 5 | −6.471 | 1.50 | 1.49176 | 57.4 |
| 6 | −9.337 | 0.10 | | |
| 7 | 59.503 | 1.50 | 1.58547 | 29.9 |
| 8 | −305.046 | variable | | |
| 9 | 5.631 | 2.18 | 1.54350 | 54.3 |
| 10 | −7.847 | 0.36 | | |
| 11 | −7.402 | 2.10 | 1.58547 | 29.9 |
| 12 | −779.225 | variable | | |
| 13 | 5.719 | 2.01 | 1.49176 | 57.4 |
| 14 | 6.068 | 2.32 | | |
| 15 | 5.886 | 2.30 | 1.49176 | 57.4 |
| 16 | ∞ | 3.34 | | |
| 17 | ∞ | 19.80 | 1.49176 | 57.4 |
| 18 | ∞ | 0.50 | | |
| 19 | 13.967 | 2.70 | 1.49176 | 57.4 |
| 20 | −18.087 | 0.50 | | |
| 21 | 10.257 | 1.50 | 1.58547 | 29.9 |
| 22 | 8.742 | | | |

TABLE 5

3rd surface
$K = 0$
$A_4 = 0.21720825 \times 10^{-2}$
$A_6 = 0.78226062 \times 10^{-4}$
$A_8 = -0.18709068 \times 10^{-5}$ 4th surface
$K = 0$
$A_4 = 0.49047491 \times 10^{-2}$
$A_6 = -0.62741871 \times 10^{-4}$
$A_8 = 0.74095626 \times 10^{-4}$ 8th surface
$K = 0$
$A_4 = -0.54274263 \times 10^{-3}$
$A_6 = -0.12822498 \times 10^{-3}$
$A_8 = 0.12490262 \times 10^{-4}$ 9th surface
$K = 0$
$A_4 = 0.28204214 \times 10^{-3}$
$A_6 = -0.49880450 \times 10^{-4}$
$A_8 = 0.84861394 \times 10^{-6}$ 12th surface
$K = 0$
$A_4 = 0.19233201 \times 10^{-2}$
$A_6 = 0.96361351 \times 10^{-4}$
$A_8 = -0.10335280 \times 10^{-4}$ 13th surface
$K = 0$
$A_4 = 0.42123353 \times 10^{-3}$
$A_6 = -0.43568062 \times 10^{-5}$
$A_8 = 0$ 15th surface
$K = 0$
$A_4 = -0.21919968 \times 10^{-2}$
$A_6 = 0.19395481 \times 10^{-4}$
$A_8 = -0.13455724 \times 10^{-5}$ 20th surface
$K = 0$
$A_4 = 0.10685156 \times 10^{-3}$
$A_6 = 0.76527936 \times 10^{-6}$
$A_8 = 0$

TABLE 6

| Diopter | −1.1 Dpt | −1.1 Dpt | −1.1 Dpt |
|---|---|---|---|
| Magnification | 0.35 | 0.41 | 0.52 |
| d2 | 0.55 | 1.61 | 2.10 |
| d8 | 8.45 | 6.07 | 3.52 |
| d12 | 7.62 | 8.94 | 11.0 |

As described on the foregoing pages, the real-image variable magnification finder of the present invention has a light shielding means provided between the zooming groups of the objective lens system and, hence, any deleterious rays of light can be blocked without increasing the lens diameter of the objective lens system or the size of the correcting prism even if the vie wangle is increased.

What is claimed is:

1. A real-image variable magnification finder that comprises, in order from the object side, an objective lens system, a condenser lens with which the image of the object formed by the objective lens system is directed to an eyepiece lens system, an erecting prism system for inverting the image of the object, and the eyepiece lens system, said objective lens system comprising at least two moving groups that will move along the optical axis and a light shielding means that is provided between said moving groups for blocking deleterious rays of light.

2. A real-image variable magnification finder according to claim 1, wherein said light shielding means is adapted to move along the optical axis upon zooming independently of said moving lens groups.

3. A real-image variable magnification finder according to claim 1, wherein said light shielding means is fixed in such a way that it will not move during zooming.

4. A real-image variable magnification finder according to claim 1, wherein said light shielding means is adapted in such a way that its aperture diameter is varied as a function of a zooming operation.

5. A real-image variable magnification finder according to claim 1, wherein said light shielding means is substantially conjugative with a pupil.

6. A real-image variable magnification finder according to claim 1, wherein a first lens group of said objective lens system has a negative focal length.

7. A real-image variable magnification finder according to claim 1, wherein said objective lens system comprises, in order from the object side, a negative first lens group and a positive second lens group, said light shielding means being interposed between said first and second lens groups.

8. A real-image variable magnification finder according to claim 7, wherein a distance between said light shielding means and said position second lens group is long during low magnification and is decreased when the magnification is increased.

* * * * *